United States Patent [19]

Benjamin

[11] Patent Number: 5,462,569
[45] Date of Patent: Oct. 31, 1995

[54] RETRO-FIT FILTER UNIT FOR AIR INTAKES TO ELECTRO-MECHANICAL MACHINES

[76] Inventor: Stanley Benjamin, 9048 N. Lamon, Skokie, Ill. 60077

[21] Appl. No.: 114,158

[22] Filed: Sep. 1, 1993

[51] Int. Cl.⁶ ............................................. B01D 46/00
[52] U.S. Cl. ........................ 55/385.6; 55/495; 55/501; 55/511; 55/DIG. 31
[58] Field of Search ................ 55/385.1, 385.4, 55/385.6, 490, 495, 501, 511, DIG. 31

[56] References Cited

U.S. PATENT DOCUMENTS

| | | | |
|---|---|---|---|
| 3,127,259 | 3/1964 | Boylan | 55/511 |
| 3,469,031 | 9/1969 | Setchell | 55/385.6 |
| 3,768,235 | 10/1973 | Meyer et al. | 55/490 |
| 3,912,473 | 10/1975 | Wilkins | 55/511 |
| 3,950,157 | 4/1976 | Matney | 55/490 |
| 3,971,877 | 7/1976 | Lee . | |
| 4,470,834 | 9/1984 | Fasanaro et al. | 55/501 |
| 4,659,349 | 4/1987 | Rodi et al. . | |
| 4,702,154 | 10/1987 | Dodson . | |
| 4,781,526 | 11/1988 | Mead | 55/501 |
| 4,889,542 | 12/1989 | Hayes | 55/385.6 |
| 5,007,946 | 4/1991 | Babini . | |
| 5,122,918 | 6/1992 | Chao . | |
| 5,147,430 | 9/1992 | Kidd | 55/511 |
| 5,163,870 | 11/1992 | Cooper | 55/385.6 |
| 5,176,570 | 1/1993 | Liedl | 55/511 |

FOREIGN PATENT DOCUMENTS

| | | | |
|---|---|---|---|
| 0380026 | 8/1990 | European Pat. Off. | 55/501 |
| 1-266827 | 10/1989 | Japan | 55/495 |

*Primary Examiner*—C. Scott Bushey
*Attorney, Agent, or Firm*—Patula & Associates

[57] ABSTRACT

A filter unit is removably attached to a machine housing over an air intake vent to prevent particulate matter from entering the machine and thereby damaging the machine. The filter unit includes a filter, a filter housing, and fasteners to removably attach the filter housing to the machine. The filter unit can be retro-fit by a user of the machine or can be attached during manufacturing.

7 Claims, 2 Drawing Sheets

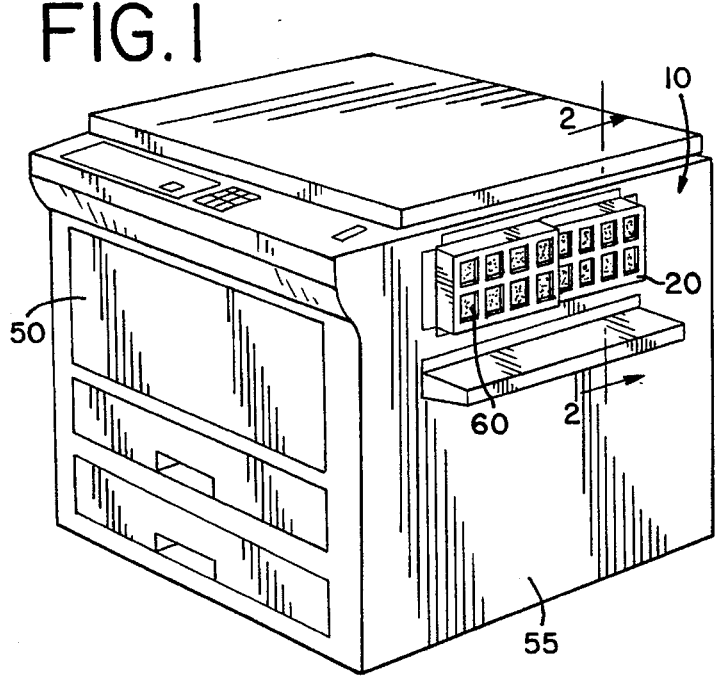
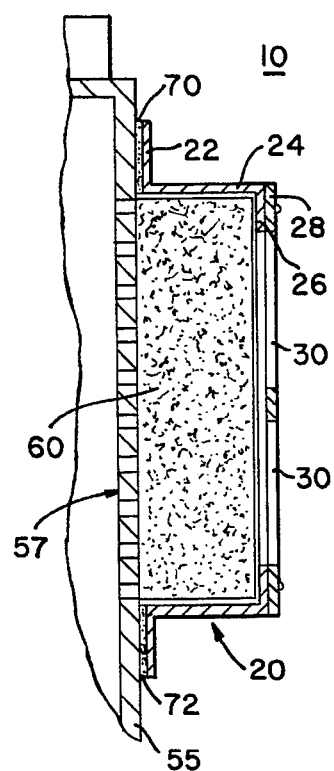
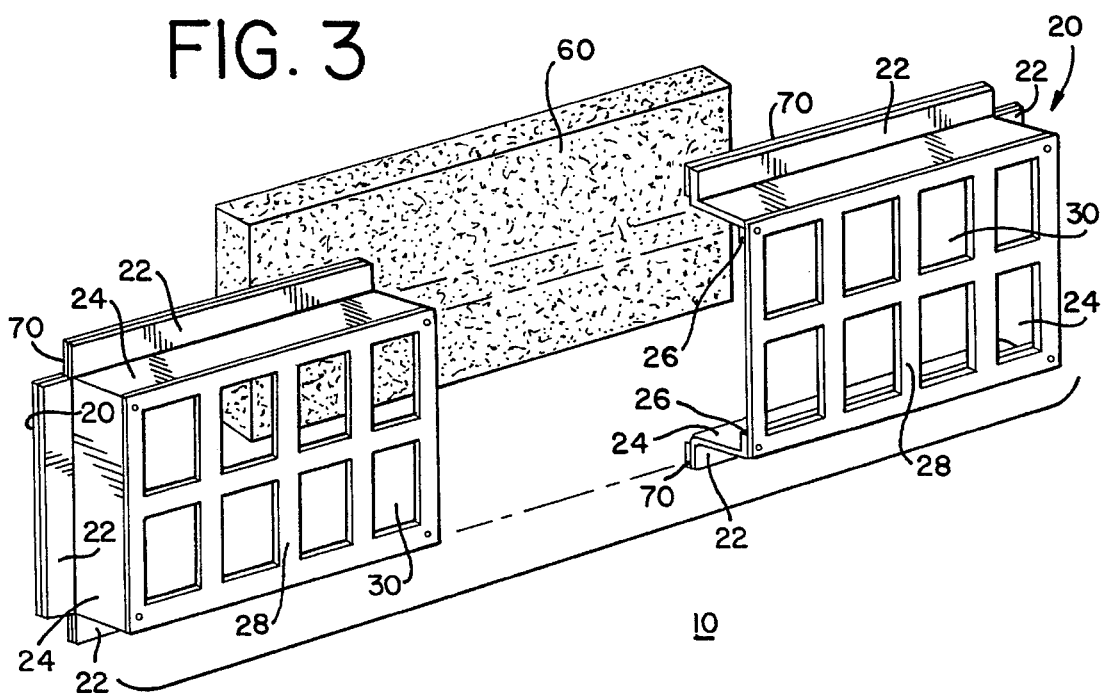

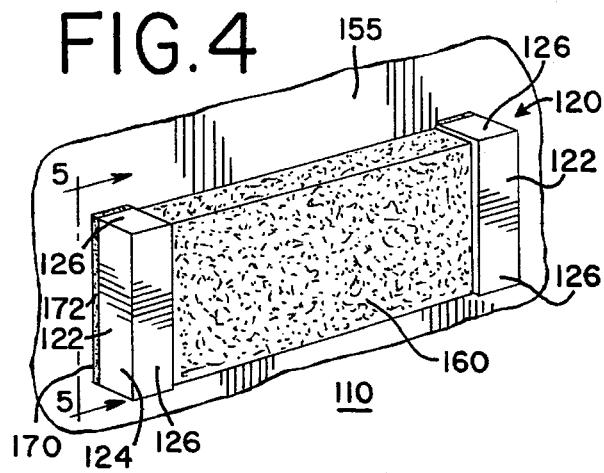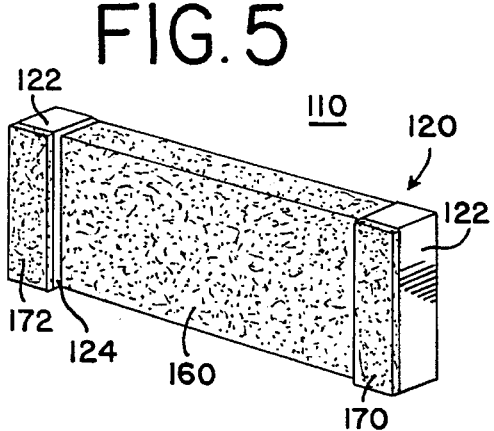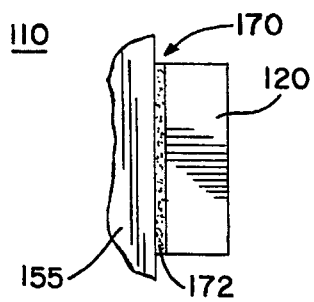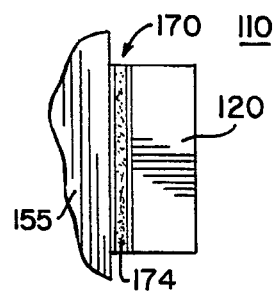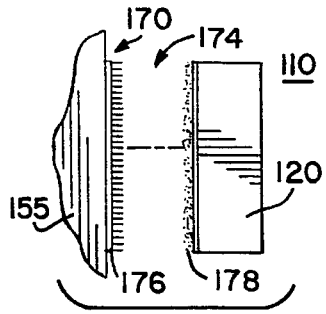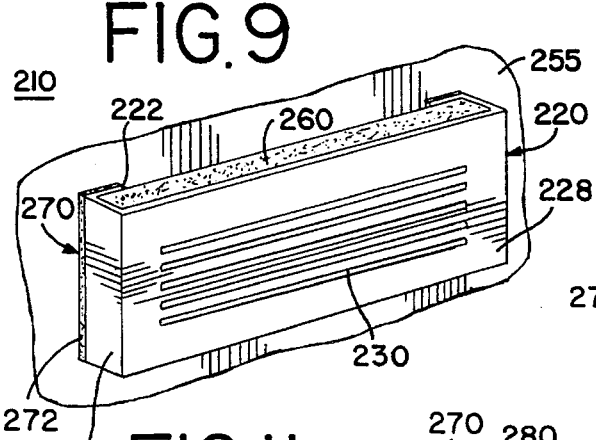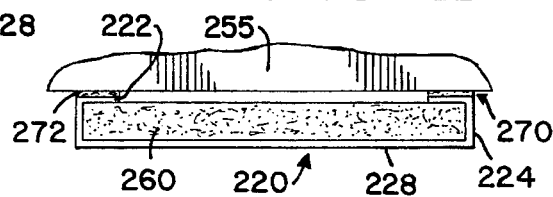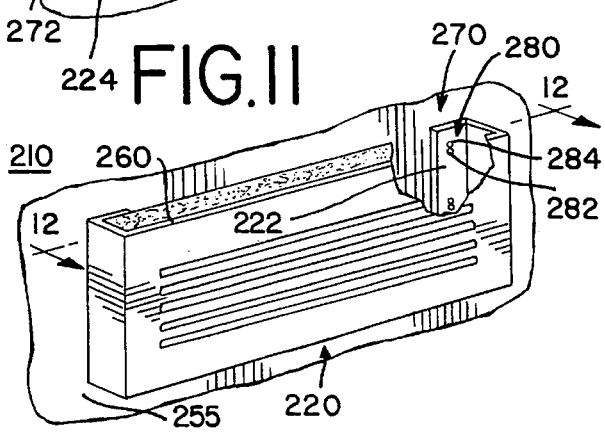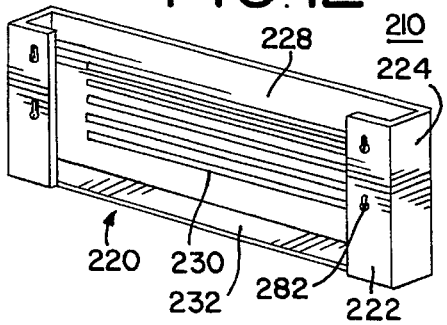

RETRO-FIT FILTER UNIT FOR AIR INTAKES TO ELECTRO-MECHANICAL MACHINES

This invention relates to a novel retro-fit means for fastening a filter over air intakes to electro-mechanical machines which means will enable average users, as well as original equipment manufacturers, to easily fasten a filter over any air intake and keep particulate matter, e.g., dust, paper particles, from entering the air intakes of copier machines, laser printers and other machine housings.

BACKGROUND OF THE INVENTION

The present invention is a novel means for the positioning and fastening of an air filter to the air intake vent of a machine, especially a photocopier, laser printer, etc. When a copier, for example, is operating, a fan serves to intake air from outside the machine and force cool air into the machine to cool the machine. The air brought into the copier is filled with dust particles which collect on the parts within the copier causing wear, damages and eventual breakdown. To make the matter worse, static electricity resulting from copy paper having one electro-static charge and the copier having an opposite electro-static charge tends to attract the paper and dust particles within the machine. The result is a chain reaction of problems. The dust, dirt and paper particles that collect within the copier or laser printer is attracted by the static electricity reduces the lubrication among the interacting parts in the copier, which in turn causes the parts to grind together and wear. The dust and dirt also collects on the optical units. When the optical units are dirty, the automatic toner system is unable to accurately control the amount of toner in the copier, subsequently resulting in poor copy quality: too dark or too light. The collection of dirt and dust within the copier creates a myriad of problems and results in expensive service calls, lost time, and unnecessary costs due to an inoperable copier.

U.S. Pat. No. 5,122,918 to Chao and U.S. Pat. No. 4,889,542 to Hayes disclose filters which purpose is to keep the disk drive and the internal mechanisms of a computer clean. U.S. Pat. No. 4,659,349 to Rodi, et al. discloses a filter for a switch cabinet and U.S. Pat. No. 3,971,877 to Lee discloses a filter for an electronic chassis. The filters disclosed in Chao, Hayes, Rodi et al. and Lee are all attached directly to the machine housing. The novelty of the present invention is that the filter is not directly attached to the interior machine housing requiring major installation time and expense, but in the present invention, a bracket is attached adjacent to or in proximity of an air vent at the machine's exterior. This bracket is easily attached by anyone without any special skill and is what holds the filter in place.

U.S. Pat. No. 5,007,946 to Babini discloses a grating which is attached to a computer, but which main function is to protect against electromagnetic and electrostatic interference. Babini also discloses a net fastened to the computer housing by the grating for avoiding the penetration of dust into the computer housing. Unlike Babini, the means for fastening the filter to the machine housing in the present invention is relatively simple in use and construction, allowing the present invention to be attached to the machine housing by an average user after the machine has left the manufacturer. No technical skill is required to attach the present invention to the photocopier or any other machine with an air intake or to replace the filter after use.

Finally, U.S. Pat. No. 4,702,154 to Dodson discloses a retrofit power supply and fan unit for personal computers. The invention disclosed by Dodson is unlike the present invention in that Dodson addresses a power supply and fan unit and not a means for attaching a filter over an air intake on a machine.

There is no known device which can be readily installed or applied to a photocopier or laser printer by an average user to prevent the introduction of particulate matter, especially paper particles into the machine.

SUMMARY OF THE INVENTION

The novelty of the present invention is a retro-fit means for fastening a filter over the air intake of a copier machine or laser printer or any electro-mechanical device having an air intake. The invention prevents machine breakdown due to poor lubrication and poor copy quality as a result of dirty optical units by providing a filter over the air intake to greatly diminish the particulate matter pulled into the copier by the fan and agitated and attracted by static electricity built up in the machine.

Further, the filter unit is not limited for use with copiers, but may be used with other equipment having an air intake. The filter may be disposable and is conveniently located and accessed in order that the machine owner may replace it when necessary, without the expense of a service call and machine down time. The retro-fit means for fastening a filter is easy for the average person or an original equipment manufacturer to attach to the machine housing. It also places the filter in an easy to access place in order that the user can readily change the filter without the necessity of a service call.

It is the principle object of the present invention to provide a means for preventing particulate matter from entering air intakes of electro-mechanical machines and thus causing damage when reacting to static electricity generated within the machine.

It is a further object of the invention to provide an attachable filter system to machines already in use.

It is also an object of the invention to provide an attachable filter system to machines being manufactured.

It is an additional object of the invention to provide an attachable filter system to machines, in which the filter is easily accessible and readily replaceable.

It is another object of the present invention to position a filter over an air intake of an electro-mechanical machine in order that particulate matter can be removed from the air before the air enters the machine.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF DRAWINGS

A fuller understanding of the foregoing may be had by reference to the accompanying drawings, wherein:

FIG. 1 is a perspective view of the present invention in use on a copier machine;

FIG. 2 is a cross-sectional view of the invention attached over an air intake in a machine wall;

FIG. 3 is an exploded view of the present invention;

FIG. 4 is a perspective view of an alternate embodiment of the present invention in use on a machine wall;

FIG. 5 is a perspective view of the embodiment of FIG. 4;

FIG. 6 is a side view of the embodiment of FIG. 4;

FIG. 7 is a side view of the embodiment of FIG. 4 having alternate attachment means;

FIG. 8 is a partially exploded side view of the embodiment of FIG. 7;

FIG. 9 is a perspective view of another embodiment of the present invention in use on a machine wall;

FIG. 10 is a top view of the embodiment of FIG. 9;

FIG. 11 is a partially broken away perspective view of the embodiment of FIG. 9 illustrating the attachment means; and FIG. 12 is a perspective view of the housing of the embodiment of FIG. 9.

DETAILED DESCRIPTION OF THE PREFERRED EMBODIMENT OF THE INVENTION

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

FIGS. 1–12 illustrate generally the filter system of the present invention 10 comprising a housing 20, a filter 60, and attachment means 70. The filter system attaches to a machine housing over an air intake of the machine housing to filter air entering a machine, especially a laser printer or electro-static photocopy machine. The need for the filter system of the present invention on such machines is greatly increased due to the static electricity in such machines, built up by the interaction of paper entering the machine. Paper loaded into electro-static copy machines and laser printers is cut by the paper manufacture into reams and then wrapped for storage and shipping. This process creates a static charge to the ream of paper. The copier or printer (of whatever kind) may have a differing charge, thereby causing the resulting harmful attraction of paper particles into the machine. The present invention either lessens or eliminates the introduction of these particles into the machine.

Referring in particular to FIG. 1, the present invention 10 is shown in use on a machine 50, illustrated as a copier machine, through which paper travels. Invention 10 comprises a filter housing 20 and a filter 60, placed inside filter housing 20. Filter housing 20 is attached to a machine housing wall 55 of machine 50, over an air intake (not shown) in the machine housing wall 55. Filter housing 20 is removably attached to wall 55 by suitable attachment means (not shown) so as to allow easy access to filter 60 when needed, for example, to replace an old filter with a new one.

As is better seen in FIG. 2, filter housing 20 is removably attached to machine housing wall 55 over air intake 57 by attachment means 70. Attachment means 70 is any suitable attachment means, but is illustrated in this embodiment as double sided tape 72. Attachment means 70 is placed on mounting flanges 22 of filter housing 20. Mounting flanges 22 extend perpendicularly outward from a lower end of side walls 24 of housing 20. At an opposite end (upper end) of side walls 24, top flanges 26 extend perpendicularly inward from side walls 24. Mounted to top flanges 26 is a housing cover 28 suitably attached to top flanges 26. Housing cover 28 contains a plurality of openings 30 to allow air to pass therethrough to filter 60 and air intake 57.

FIG. 3 is an exploded view of invention 10 showing filter housing 20 and filter 60. Filter 60 can be made of any suitable material to act as a filter for removing particulate matters from the air entering the machine. Housing 20 is shown as two separate halves. This is advantageous since only one half need be removed to replace the filter. The entire housing 20 is rectangular and contains four side walls 24. Each side wall 24 contains a mounting flange 22 and a top flange 26. Placed on mounting flange 22 is attachment means 70. Suitably attached to top flange 26 is housing cover 28. As can be seen, housing cover 28 contains a plurality of openings 30. While the filter housing 20 is illustrated as being two separate halves, it should be understood that the housing could be one integral piece. Similarly, housing cover 28 could be integral with housing 20.

FIG. 4 illustrates an alternate embodiment of the present invention 110. Invention 110 comprises a double box end filter housing 120 which receives and supports a filter 160. Filter housing 120 is removably attached to a machine housing wall 155 over the machine air intake (not shown). Housing 120 comprises two rectangular box-like mounting elements 122 having an opened end for receiving an end of filter 160. Elements 122 contain an end wall 124 and four side walls 126 perpendicular thereto. Placed on one side wall of each element 122 of housing 120 is an attachment means 170. Attachment means 170 removably attaches housing 120 to machine housing wall 155. As illustrated in FIG. 4, attachment means 170 is double sided tape 172.

FIG. 5 is a perspective view of invention 110. Each mounting element 122 of housing 120 is placed on an end of filter 160. An attachment means 170, illustrated as double sided tape 172 is placed on a side wall 124 of each mounting element 122. The entire filter system can then be removably attached to a machine housing wall over an air intake to filter air entering the machine.

FIGS. 6–8, as viewed in the direction of arrows 6—6 of FIG. 4, illustrate how the attachment means 170 removably secures the filter housing 120 to the machine housing wall 155. In FIG. 6, attachment means 170 is illustrated as double sided tape 172 which removably holds housing 120 to wall 155. In FIG. 7, attachment means 170 is illustrated as complimentary hook and loop type fasteners 174. FIG. 8 shows the hook and loop type fasteners 174 separated for easy removal of the housing 120. Hook side 176 of fasteners 174 is shown attached to machine housing wall 155 while loop side 178 is shown attached to filter housing 120. It should be understood however that the hook side could be placed on housing 120 and the loop-side on wall 155.

FIG. 9 illustrates yet another embodiment of the present invention 210, wherein while the filter housing 220 is removably attached to machine housing wall 255, the filter housing 220 need not be removed to replace filter 260 in housing 220. Filter housing 220 is removably attached to machine housing wall 255 by attachment means 270. Attachment means 270 is illustrated as double sided tape 272 placed on mounting flanges 222 of housing 220. Mounting flanges 222 are connected to the side or end walls 224 of housing 220. End walls 224 of housing 220 are connected by front panel 228 of housing 220. Front panel 228 contains openings or slots 230 for allowing air to pass therethrough. Filter housing 220 further includes a filter support flange 232 (see FIG. 12) at a bottom position thereof for supporting filter 260. Filter 260 is easily inserted into housing 220 from an opening at the top of housing 220 until it contacts and rests upon support flange 232.

FIG. 10 shows a top view of invention 210. Filter housing 220 is removably attached to a machine housing wall 255 by attachment means 270, illustrated as double sided tape 272. Filter 260 is inserted into housing 220. Housing 220 includes mounting flanges 222, end walls 224 and front panel 228.

FIG. 11 shows housing 220 of invention 210 removably mounted on machine housing wall 255 by attachment means 270. Attachment means 270 is illustrated as button hook and eye fasteners 280. Mounting flange 222 of housing 220 is shown containing at least one eye 282 formed therein for receiving a button hook 284 mounted to wall 255. As indicated, housing 220 need not be removed to take out or insert filter 260.

FIG. 12 is a perspective view of filter housing 220 of invention 210, in the direction of arrows 12—12 in FIG. 11. Filter housing 220 comprises two mounting flanges 222 having eyes 282, two end walls 224, a front panel 228 having slots 230, and a filter support flange 232.

It is foreseen that the filter system of the present invention could be sold as an individual unit, coming in many different shapes and sizes or being readily adjustable to adequately cover air intakes of many different machines, and retro-fitted to the machines by individual purchasers. It is further foreseen that the filter system of the present invention could be removably attached to the machine during manufacturing by the manufacturer. Further, a user could interchange the filter systems of the present invention from machine to machine.

By attaching the filter system of the present invention to machines in which a substantial amount of static electricity is built up within the machine, especially laser printers and copy machines, which need to have a ream(s) of paper stored within the machine for use, many times having a differing static charge thereby causing an attraction of small paper particles (left over from the paper cutting and packaging process) into the internal workings of the machine. The invention also prevents potentially damaging dust particles from entering the machine from the air space surrounding the machine. Since the filter system of the present invention removes particulate matter from the air entering the machine, static electricity occurring within the machine is prevented from cooperating with any such particles and damaging the inside mechanisms of the machine.

The foregoing specification describes only the preferred embodiment of the invention as shown. Other embodiments besides the ones described herein and claimed may be articulated as well. The terms and expressions therefore serve only to describe the invention by example only and not to limit the invention. It is expected that others will perceive differences which while differing from the foregoing, do not depart from the spirit and scope of the invention herein described and claimed.

I claim:

1. A filter unit for preventing particulate matter from entering an air intake vent in a machine housing of a machine, said filter unit comprising:

an air filter;

a filter housing for removably receiving said air filter; and attachment means for removably attaching said filter housing to said machine housing in a location such that said filter extends over the entire air intake vent of said machine housing;

said filter housing comprises two parts placed end to end collectively forming four side walls, said four side walls each having a length, a near edge and a far edge, a mounting flange extending perpendicularly outward from each said near edge of said four side walls along said length thereof, a top flange extending perpendicularly inward from each said far edge of said four side walls along said length thereof, and a housing cover having at least one opening mounted to said top flanges, said attachment means placed in association with said mounting flanges;

said filter being removable from said filter housing upon detaching one of said two parts of said filter housing from said machine housing.

2. A filter unit for preventing particulate matter from entering an air intake vent in a machine housing of a machine, said filter unit comprising:

an air filter;

a filter housing for removably receiving said air filter; and attachment means for removably attaching said filter housing to said machine housing in a location such that said filter extends over the entire air intake vent of said machine housing;

said filter housing comprises first and second rectangular box-shaped mounting elements each having an end wall and four side walls and defining an opening for receiving an end of said filter, said attachment means placed in association with one of said four side walls;

said first box shaped mounting element placed on one end of said air intake vent, and said second box shaped mounting element placed on an opposite end of said air intake vent;

said filter being removable from said filter housing while said filter housing is attached to said machine housing.

3. A filter unit in combination with an electro-mechanical machine for preventing particulate matter from entering an air intake vent in a housing of said machine, said filter unit comprising:

an air filter;

a double box end filter housing for removably receiving said air filter; and attachment means for removably attaching said filter housing to said machine housing in a location such that said filter extends over the entire air intake vent of said machine housing;

said filter housing comprises two parts placed end to end collectively forming four side walls, said four side walls each having a length, a near edge and a far edge, a mounting flange extending perpendicularly outward from each said near edge of said four side walls along said length thereof, a top flange extending perpendicularly inward from each said far edge of said four side walls along said length thereof, and a housing cover having at least one opening mounted to said top flanges, said attachment means placed in association with said mounting flanges;

said filter being removable from said filter housing upon detaching one of said two parts of said filter housing from said machine housing.

4. A filter unit in combination with an electro-mechanical machine for preventing particulate matter from entering an air intake vent in a housing of said machine, said filter unit comprising:

an air filter;

a double box end filter housing for removably receiving said air filter; and attachment means for removably attaching said filter housing to said machine housing in a location such that said filter extends over the entire air intake vent of said machine housing;

said filter housing comprises first and second rectangular box-shaped mounting elements each having an end wall and four side walls and defining an opening for receiving an end of said filter, said attachment means placed in association with one of said four side walls;

said first box shaped mounting element placed on one end of said air intake vent, and said second box shaped mounting element placed on an opposite end of said air intake vent;

said filter being removable from said filter housing while said filter housing is attached to said machine housing.

5. The invention of claim 1, 2, 3, or 4, wherein said attachment means is double sided tape.

6. The invention of claim 1, 2, 3, or 4, wherein said attachment means is hook and loop type fasteners.

7. The invention of claim 1, 2, 3, or 4, wherein said attachment means is a button hook and eye type fastener.

* * * * *